INVENTOR.
CHARLES EDWARD THOMAS, JR.
BY Kingsland, Rogers, Ezell,
Eilers & Robbins
ATTORNEYS United States Patent Office 3,384,785
Patented May 21, 1968

3,384,785
CONTROL SYSTEMS
Charles E. Thomas, Jr., New Orleans, La., assignor to Sperry Rand Corporation, New York, N.Y., a corporation of Delaware
Filed Jan. 22, 1965, Ser. No. 427,394
12 Claims. (Cl. 315—308)

ABSTRACT OF THE DISCLOSURE

An electric welder, which depends upon the flow of welding current to develop a feedback signal that will cause the variable output source of that electric welder to hold that welding current at pre-set levels, can tend to supply excessive amounts of energy to a workpiece during the time an arc is being established; because there will be no welding current and hence no feedback signal prior to the establishing of that arc. Such an electric welder can be kept from supplying excessive amounts of energy to a workpiece during the time an arc is being established by providing a feedback loop which is closed prior to the establishing of an arc and which will hold the output of that variable output source at a predetermined level until an arc has been established, and which will be open, after that arc has been established, to permit that variable output source to supply welding current at the said pre-set levels.

Figure 1:
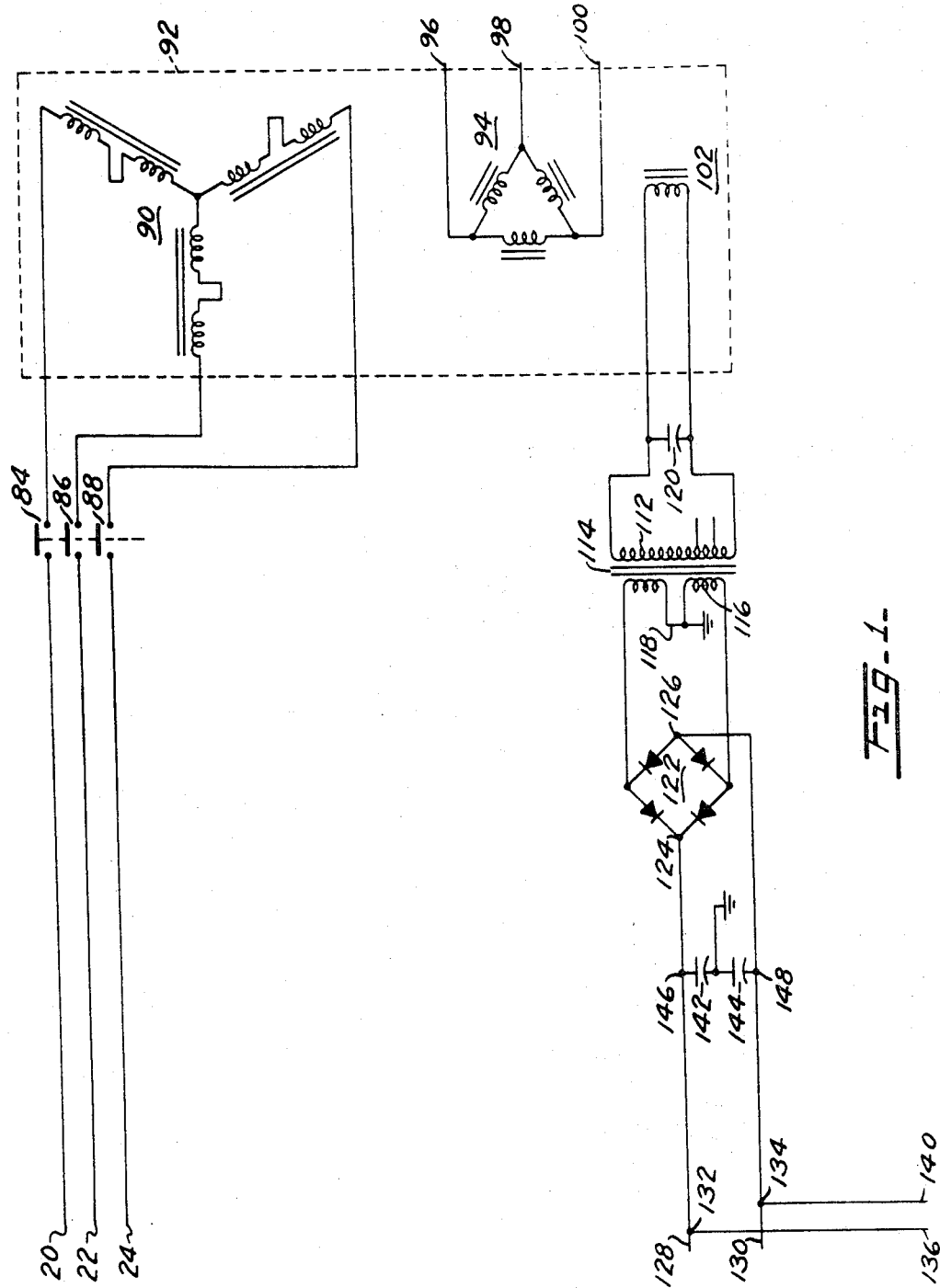

This invention relates to improvements in control systems. More particularly, this invention relates to improvements in control systems for electric welders.

It is, therefore, an object of the present invention to provide an improved control system for an electric welder.

Harold C. Hoyt application Ser. No. 199,771 for Control Systems, which was filed June 4, 1962, now Patent No. 3,321,667, issued May 23, 1967, discloses a control system for an electric welder; and that control system is very useful and effective. That control system has an ignition circuit which can be set to permit the magnetic amplifiers of that control system to be biased to saturation before an arc is initiated; and the biasing of those magnetic amplifiers to saturation is desriable where large currents are needed at the time the arc is initiated. Alternatively, that ignition circuit can be set to permit the magnetic amplifiers of that control system to be biased to cut-off before an arc is initiated; and the biasing of those magnetic amplifiers to cut-off is desirable where very small currents are needed at the time the arc is initiated. In some cases, it would be desirable to bias the magnetic amplifiers of the control system of the said Hoyt application to levels intermediate saturation and cut-off before an arc is initiated; and the present invention makes such biasing possible. It is, therefore, an object of the present invention to provide a control system which makes it possible to bias the magnetic amplifiers of an electric welder to levels intermediate saturation and cut-off before an arc is initiated.

Other and further objects and advantages of the present invention should become apparent from an examination of the drawing and accompanying description.

In the drawing and accompanying description a preferred embodiment of the present invention is shown and described, but it is to be understood that the drawing and accompanying description are for the purpose of illustration only and do not limit the invention and that the invention will be defined by the appended claims.

In the drawing,

FIG. 1 is a schematic diagram of one part of the circuit of one embodiment of electric welder and programming device with which the present invention is used, and it shows the power transformer of that circuit.

Figure 2:
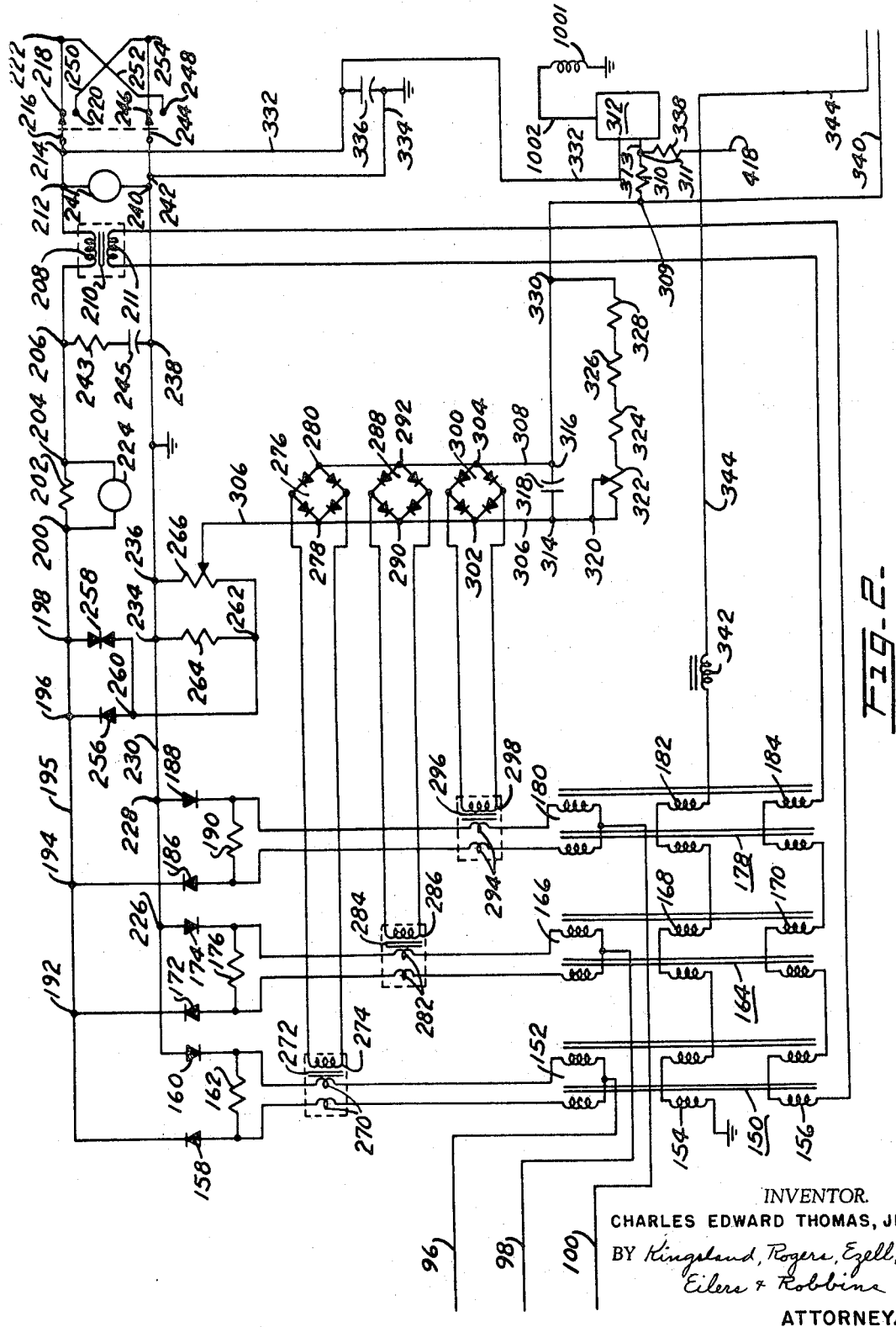
Figure 3:
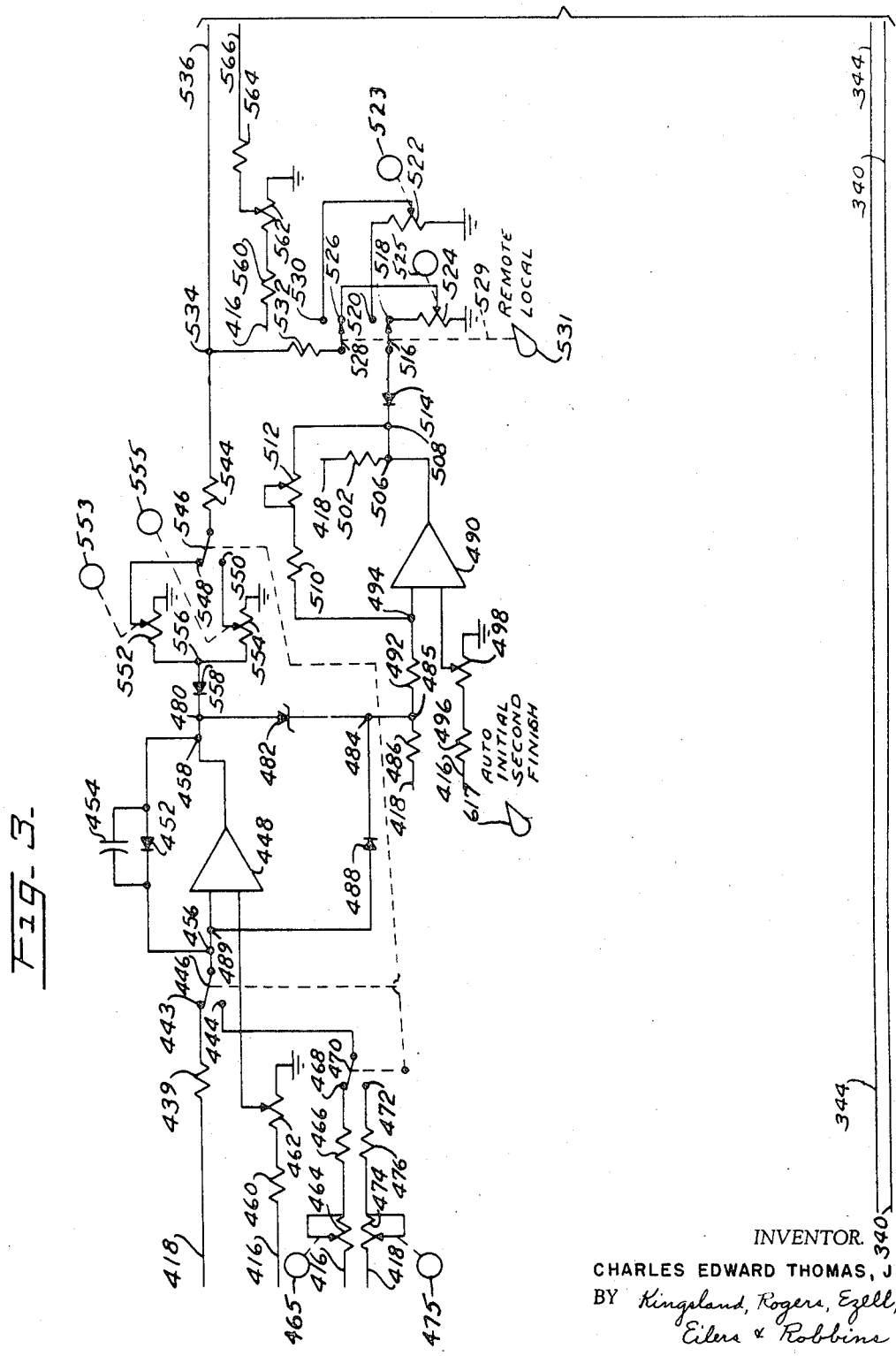

FIG. 2 is a schematic diagram of another part of the circuit of the said electric welder and programming device, and it shows the magnetic amplifiers used in that circuit, FIG. 3 is a schematic diagram of another part of the circuit of the said electric welder and programming device, and it shows the sub-circuits which develop the reference voltages used in controlling the magnetic amplifiers of FIG. 2.

Figure 4:
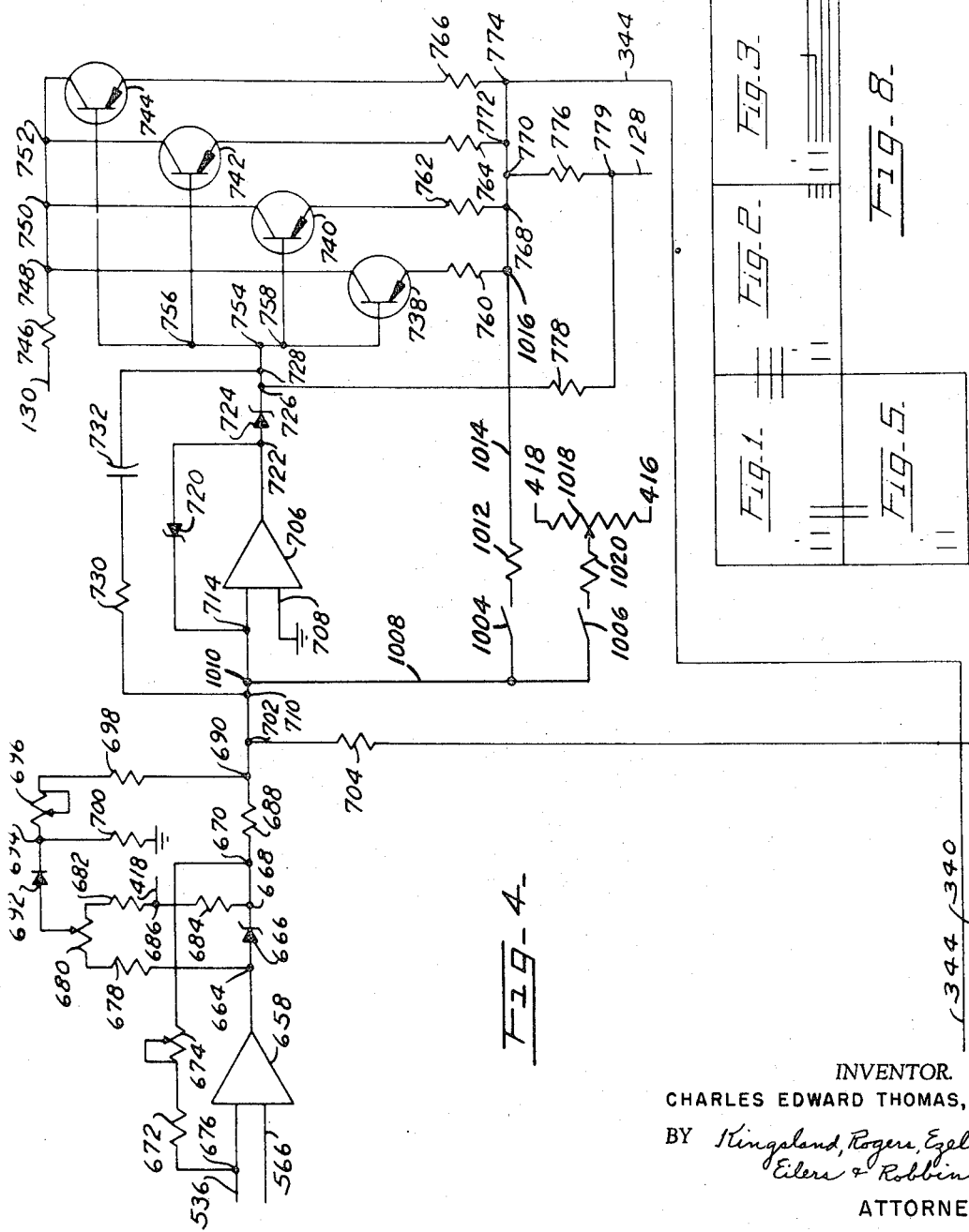
Figure 5:
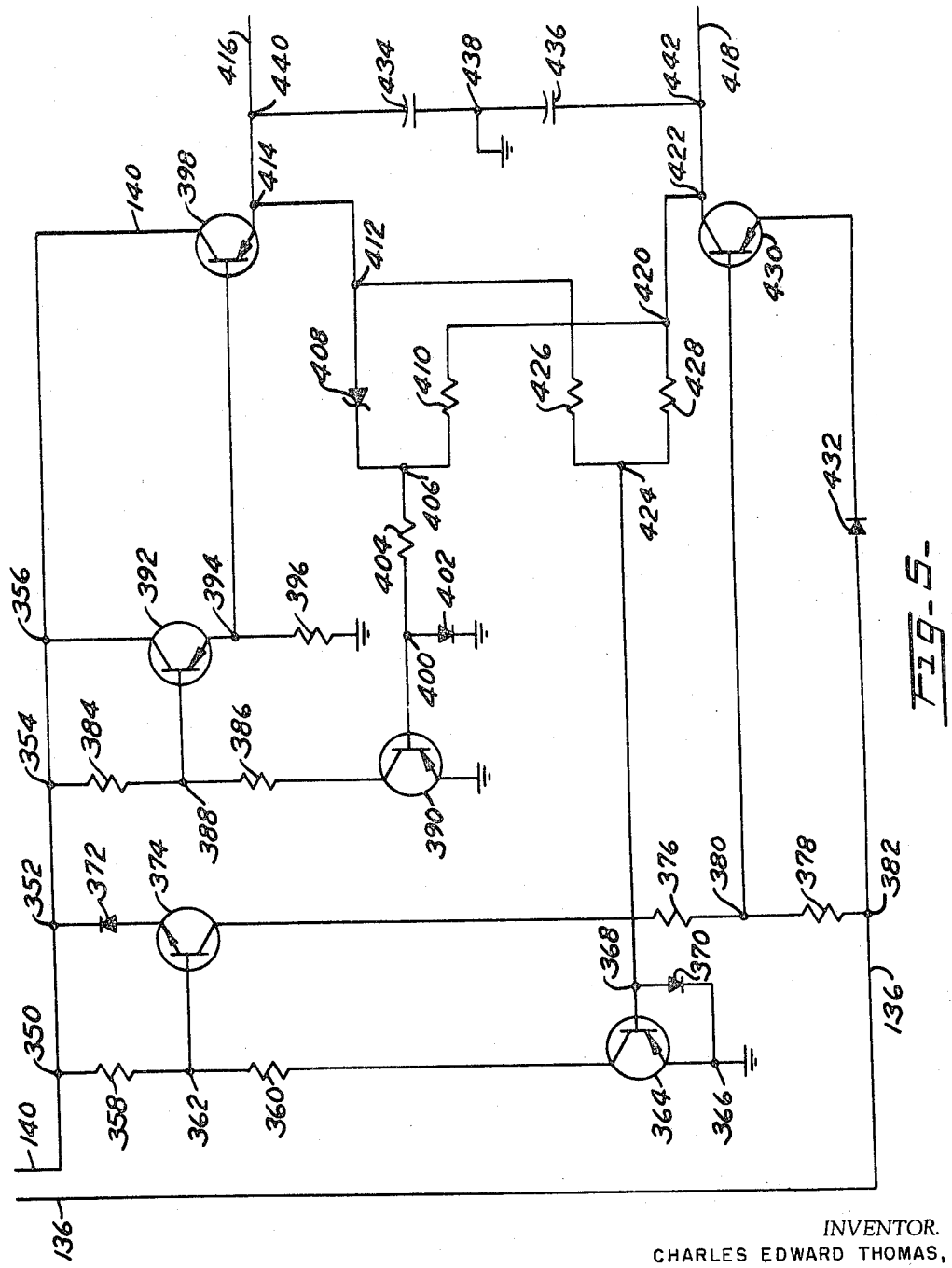
Figure 6:
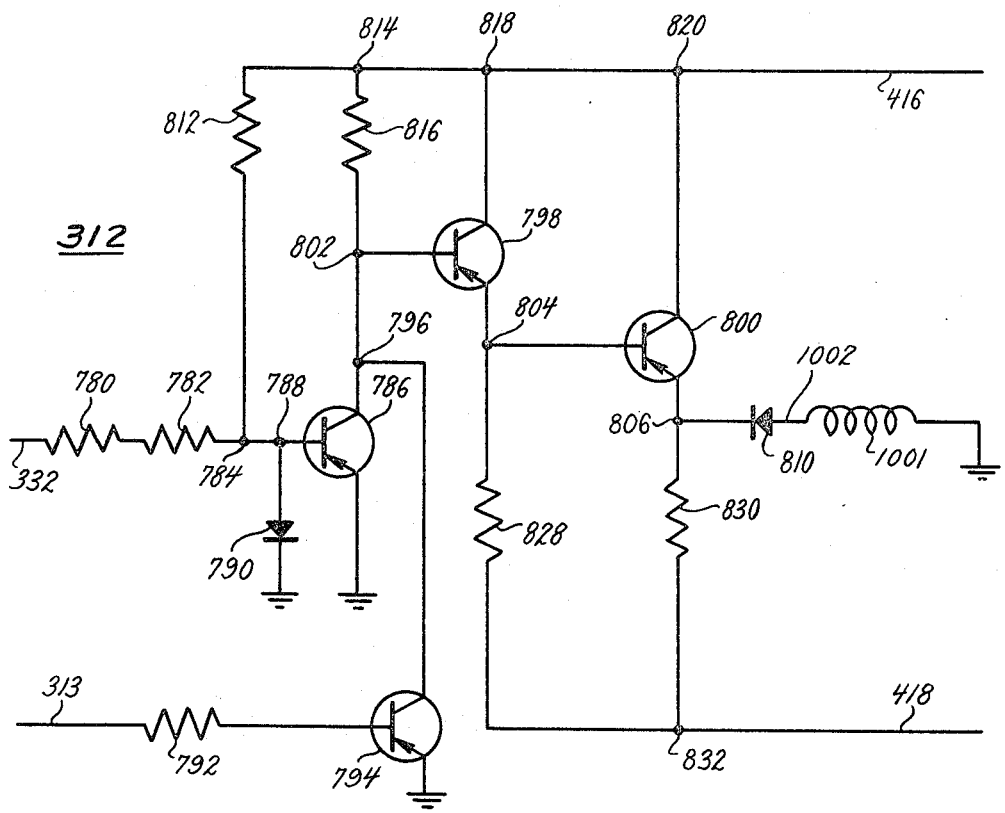
Figure 9:
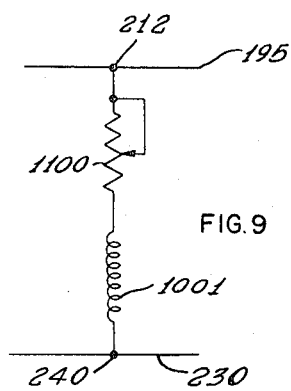
Figure 7:
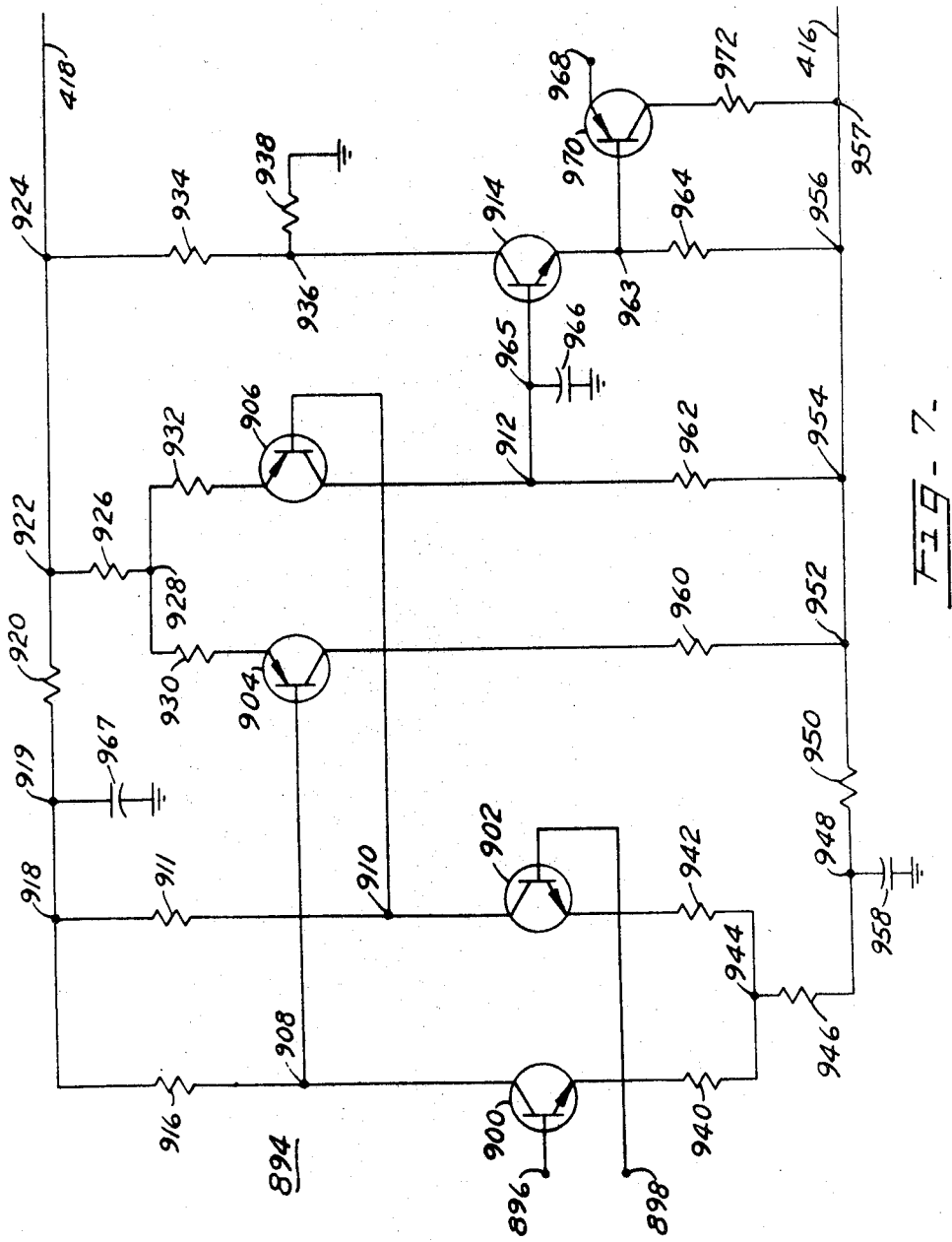

FIG. 4 is a schematic diagram of another part of the circuit of the said electric welder and programming device, and it shows the manner in which the summing amplifier and the preamplifier of that circuit are connected, FIG. 5 is a schematic diagram of a voltage regulator which is used in the circuit of the said electric welder and programming device, FIG. 6 is a schematic diagram of the ignition circuit which is used in the said electric welder and programming device, FIG. 7 shows an amplifier which can be used as the integrating operational amplifier, as the inverting operational amplifier, as the summing amplifier, and as the pre-amplifier in the circuit of the said electric welder and programming device, FIG. 8 is a diagram showing how the parts of the circuit shown by FIGS. 1–5 are interrelated and, FIG. 9 is a view which shows how the relay coil of FIGS. 2 and 6 can be made to respond to the output voltage of the electric welder.

Referring to the drawing in detail, all of the numerals below 1000 denote components which are identical to the correspondingly numbered components of the said Hoyt application. Further, the operation of all components which are denoted by numerals below 1000 is, except, as described hereinafter, identical to the operation of the correspondingly numbered components in the said Hoyt application.

As pointed out in the said Hoyt application, the numeral 92 in FIG. 1 denotes a power transformer which has a primary winding 90 connected to a source of three-phase alternating current by relay contacts 84, 86 and 88 and by conductors 20, 22 and 24. That transformer has a secondary winding 102 which supplies single phase sixty cycle alternating current to the conductors 108 and 110, and which coacts with transformer 114 and bridge rectifier 122 to supply a positive voltage of thirty-two volts at the junction 132 and a negative voltage of thirty-two volts at the junction 134. The transformer 114 has a tapped primary winding 112, and the taps of that primary winding make it possible for that transformer to provide a desired voltage across the secondary winding 116 of that transformer. The effective terminals of that tapped primary winding are connected to the terminals of the secondary winding 102 of power transformer 92. A capacitor 120 is connected across the effective terminals of the primary winding 112, and that capacitor will tend to filter out high frequency currents. The secondary winding 116 of the transformer 114 has two sections; and the adjacent terminals of those sections are interconnected by a connector 118. Further, those adjacent terminals are connected to the common return of the circuit, thereby making the secondary winding a center-tapped winding.

The outer terminals of the secondary winding 116 are connected to the input terminals of the bridge rectifier 122. That bridge rectifier will coact with the center-tapped secondary winding 116 to provide full wave rectified alternating current. The output terminals 124 and 126 of that rectifier are, respectively, connected to junctions 132 and 134 by junctions 146 and 148. Capacitors 142 and 144 are connected in series between the junctions 146 and 148; and the confronting terminals of those capacitors are connected to the common return.

The capacitors 142 and 144 are provided to filter out A.C. ripple. Conductor 128 and conductor 130 extend into FIG. 4 to supply those positive and negative voltages to the parts of the circuit shown in FIG. 4. Conductors 136 and 140 extend from the junctions 132 and 134, respectively, into FIG. 5 to supply those positive and negative voltages to the part of the circuit shown in FIG. 5. The transformer 92 also has a secondary winding 94 which supplies three phase sixty cycle alternating current to the magnetic amplifiers 150, 164 and 178 in FIG. 2 by conductors 96, 98 and 100. The magnetic amplifier 150 in FIG. 2 has output windings 152, has control windings 154, and has control windings 156. A diode 158 has the anode thereof connected to the upper end of one of the output windings 152 and a diode 160 has the cathode thereof connected to the upper end of the other of the output windings 152. The lower ends of the output windings 152 are connected together, and are connected to the conductor 96 which extends from the secondary winding 94 of the power transformer 92 in FIG. 1. A resistor 162 is connected between the upper ends of the output windings 152.

The magnetic amplifier 164 has output windings 166, has control windings 168, and has control windings 170. A diode 172 has the anode thereof connected to the upper end of one of the output windings 166, and a diode 174 has the cathode thereof connected to the upper end of the other of the output windings 166. The lower ends of those output windings are connected together, and are connected to the conductor 98 which extends from the secondary winding 94 of the power transformer 92 in FIG. 1. A resistor 176 is connected between the upper ends of the output windings 166.

The magnetic amplifier 178 has output windings 180, has control windings 182, and has control windings 184. A diode 186 has the anode thereof connected to the upper end of one of the output windings 180, and a diode 188 has the cathode thereof connected to the upper end of the other of the output windings 180. The lower ends of those output windings are connected together, and are connected to the conductor 100 which extends from the secondary winding 94 of the power transformer 92 in FIG. 1. A resistor 190 is connected between the upper ends of the output windings 180.

The cathodes of the diodes 158, 172 and 186 are connected to a conductor 195—the latter two cathodes being connected to that conductor by junctions 192 and 194— and that conductor is connected to one terminal of a shunt 202 for a meter 224 by junctions 196, 198 and 200. Junctions 204 and 206, the primary winding 208 of a rate transformer 210, and junctions 212 and 214 connect the other terminal of the shunt 202 to the movable contact 216 of a single pole, double throw switch that has fixed contacts 218 and 220. The fixed contact 218 is directly connected to the output terminal 222 of the electric welder; and a flexible welding cable, not shown, can be suitably connected to that terminal.

The anodes of the diodes 160, 174 and 188 are connected to a conductor 230—the latter two anodes being connected to that conductor by junctions 226 and 228— and that conductor is connected to the movable contact 244 of a single pole, double throw switch by junctions 234, 236, 238, 240 and 242. The said switch has fixed contacts 246 and 248; and the fixed contact 246 is directly connected to the other output terminal 254 of the electric welder. A flexible welding cable, not shown, can be suitably connected to that output terminal. The conductor 230 is connected to the common return at a point between the junctions 236 and 238.

A jumper 250 extends between the fixed contact 220 and the output terminal 254, and a second jumper 252 extends between the fixed contact 248 and the output terminal 222. The movable contacts 216 and 244 are "ganged" together, and hence will move simultaneously. Whenever those movable contacts are in the upper positions shown by FIG. 2, the output terminal 222 will be positive and the output terminal 254 will be negative. However, when those movable contacts are, respectively, shifted down into engagement with the fixed contacts 220 and 248, the polarities of the output terminals 222 and 254 will be reversed—the output terminal 254 being positive and the output terminal 222 being negative. This selective reversal of polarity is desirable because some welding operations require the welding electrode to be positive relative to the workpiece whereas other welding operations require the work piece to be positive relative to the welding electrode.

The magnetic amplifiers 150, 164 and 178 constitute variable impedance elements that can have the impedances thereof varied to enable them to supply different levels of welding current to the output terminals 222 and 254. The use of magnetic amplifiers is desirable because the arcs, that will be established between the welding electrode and the workpiece connected to the output terminals 222 and 254, will tend to act as short circuits; and magnetic amplifiers are better adapted to having their outputs connected to virtual short circuits than are most variable impedance elements. Further, the use of magnetic amplifiers is desirable because magnetic amplifiers are less affected by ambient temperatures than are many variable impedance elements.

The meter 224 is an ammeter and will indicate the value of the direct current flowing to the output terminals 222 and 254. The numeral 241 denotes a volt meter which is connected to the junctions 212 and 240; and that meter will indicate the D.C. voltage across the output terminals 222 and 254.

The numerals 243 and 245 denote, respectively, a resistor and a capacitor which are connected in series between the junctions 206 and 238. That resistor and capacitor serve to filter out high frequency currents that could, otherwise, adversely affect the operation of the magnetic amplifiers 150, 164 and 178.

The rate transformer 210 has a secondary winding 211 that is connected to the serially-connected control windings 156, 170 and 184, respectively, of the magnetic amplifiers 150, 164 and 178. That rate transformer will coact with those control windings to provide negative feed-back for those magnetic amplifiers. As a result, that rate transformer and those control windings will respond to transient changes in the currents in the output circuit of the electric welder to cause the magnetic amplifiers to change the output currents thereof in such a way as to restore those output currents to their intended levels. In this way, variations in line voltage and variations in the lengths of the arcs are kept from adversely affecting the currents and voltages supplied to the output terminals 222 and 254.

The numeral 256 denotes a diode which has the cathode thereof connected to the junction 196; and that diode has the anode thereof connected to the conductor 230 by junctions 260 and 262, resistor 264 and junction 234 and also by junctions 260 and 262, potentiometer 266, and junction 236. A surge protector 258 is connected between the junctions 198 and 260, and thus in parallel with the diode 256. That surge protector will protect that diode from injury even if voltage surges should develop in the output circuit of the electric welder.

When a magnetic amplifier is operated so it supplies a relatively low level of output current, inductance in the load of that magnetic amplifier can tend to cause the voltage across that load to reverse. A corresponding reversal of voltage at the output of the magnetic amplifier would be objectionable because it could change the firing angle of that magnetic amplifier. In recognition of this fact, it has become customary to connect a diode, referred to as a discharge rectifier, across the output of a magnetic amplifier in such a way as to enable it to bypass any current flowing in response to the reversed voltage across the load, and thereby keep those currents from affecting the firing angle of that magnetic amplifier. The diode 256 acts as a discharge rectifier for the magnetic amplifiers 150, 164 and 178.

The outputs of the magnetic amplifiers 150, 164 and 178 are connectable to the output terminals 222 and 254 of the electric welder, by the movable contacts 216 and 244 of the single pole, double throw switches.

The numeral 270 denotes the primary windings of a current transformer 272; and those primary windings are connected intermediate the diodes 158 and 160 and the upper terminals of the output windings 152 of the magnetic amplifier 150. The secondary windings 274 of that transformer is connected to the input terminals of a full wave bridge rectifier 276. The output terminals of that rectifier are denoted by the numerals 278 and 280.

The numeral 282 denotes the primary windings of a current transformer 284, and those primary windings are connected intermediate the diodes 172 and 174 and the upper terminals of the output windings 166 of the magnetic amplifier 164. The secondary winding 286 of the transformer 284 is connected to the input terminals of a full wave bridge rectifier 288. The output terminals of that bridge rectifier are denoted by the numerals 290 and 292.

The numeral 294 denotes the primary windings of a current transformer 296, and those windings are connected intermediate the diodes 186 and 188 and the upper terminals of the output windings 180 of the magnetic amplifier 178. The secondary winding 298 of that transformer is connected to the input terminals of a full wave bridge rectifier 300. The output terminals of that rectifier are denoted by the numerals 302 and 304.

The current transformers 272, 284 and 296 are able to respond to the currents flowing through the primary windings 270, 282 and 294 thereof, during each half-cycle of each of the three phases of the A.C., to supply currents to the input terminals of the bridge rectifiers 276, 288 and 300 which are substantially independent of the load connected across the output terminals of those bridge rectifiers. Those bridge rectifiers will rectify those currents and thus provide direct currents which are proportional to the output currents of the magnetic amplifiers 150, 164 and 178. The current transformers 272, 284 and 296 will preferably have just one turn in each of the primary windings 270, 282 and 294 thereof and will preferably have many turns in the secondary windings 274, 286 and 298 thereof. As a result those current transformers will supply low level currents, which are proportional to the output currents of the magnetic amplifiers 150, 164 and 178, to the bridge rectifiers 276, 288 and 300.

The output terminals 278, 290 and 302 of the bridge rectifiers are connected to a conductor 306 which has the upper end thereof connected to the movable contact of the potentiometer 266 and which has the lower end thereof connected to the slider and to one end of an adjustable resistor 322 by junctions 314 and 320. The output terminals 280, 292 and 304 of the bridge rectifiers are connected to a conductor 308, and that conductor is connected to a junction 309 by junctions 316 and 330. A capacitor 318 is connected between the conductors 308 by the junctions 314 and 316; and that capacitor will filter out high frequency currents. A resistor 324, a resistor 326 and a resistor 328 are connected in series between the right-hand terminal of the adjustable resistor 322 and the junction 330. Those resistors coact with the adjustable resistor 322 to constitute the load for the bridge rectifiers 276, 288 and 300; and they respond to the direct currents from the output terminals of those bridge rectifiers to provide a difference of potential between the conductors 306 and 308. Because the current transformers 272, 284 and 296 coact with the bridge rectifiers 276, 288 and 300 to provide direct currents that are proportional to the output currents of the magnetic amplifiers 150, 164 and 178, the difference of potential which the resistors 324, 326 and 328 and the adjustable resistor 322 provide between the conductors 306 and 308 also will be proportional to the output currents of the magnetic amplifiers 150, 164 and 178. In one preferred embodiment of the present invention, the values of the current transformers 272, 284 and 296, of the bridge rectifiers 276, 288 and 300, of the adjustable resistor 322, and of the resistors 324, 326 and 328 were selected so that whenever the magnetic amplifiers 150, 164 and 178 were supplying one hundred amperes of current, a potential difference of four volts was developed between the conductors 306 and 308.

While the difference of potential which the resistors 324, 326 and 328 and the adjustable resistor 322 provide between the conductors 306 and 308 will be proportional to the output currents of the magnetic amplifiers 150, 164 and 178, that difference of potential may not, because of current flow through the diode 256, be proportional to the total current flowing through the arc between the electrode and the workpiece connected to the output terminals 222 and 254. Specifically, at low current levels, the inductance of the load will tend to cause current to flow through the conductors 195 and 230. The diode 256 will bypass that reverse flow of current, and thereby keep that flow of current from affecting the firing angles of the magnetic amplifiers 150, 164 and 178, but that diode cannot keep that current from flowing. As a result, D.C. circulating currents will flow through the diode 256 and through the said arc; and those D.C. circulating currents will increase the total amount of current flowing through the said arc, but will not affect the amount of current flowing through the primary windings 270, 282 and 294 of the current transformers 272, 284 and 296. This means that those current transformers, the bridge rectifiers 276, 288 and 300, and the resistors 322, 324, 326 and 328 cannot, by themselves, provide a voltage which is proportional to the total amount of current flowing through the said arc.

It will be noted that the D.C. circulating currents which flow through the diode 256 also flow through the parallel-connected resistor 264 and potentiometer 266. It will also be noted that the movable contact of the potentiometer is connected to the conductor 306. This means that the flow of D.C. circulating currents through the diode 256 will cause a D.C. voltage to be developed across the upper portion of the potentiometer 266, and that the said D.C. voltage will be added to the voltage which appears across the serially-connected resistors 322, 324, 326 and 328. The values of the resistor 264 and of the potentiometer 266 will preferably be selected so the ratio of current flowing through the diode 256 to the voltage across the upper end of the potentiometer 266 will be the same as the ratio of the currents flowing through the output windings of the magnetic amplifiers 150, 164 and 178 to the voltage across the serially-connected resistors 322, 324, 326 and 328. The slider of the adjustable resistor 322 can be set to provide a desirable ratio of the currents flowing through the output windings of the magnetic amplifiers 150, 164 and 178 to the voltage across the serially-connected resistors 322, 324, 326 and 328, and then the movable contact of the potentiometer 266 can be set to provide a comparable ratio for the current flowing through the diode 256 to the voltage across the upper end of that potentiometer. In this way, the current transformers 272, 284 and 296, the bridge rectifiers 276, 288 and 300, and the serially-connected resistors 322, 324, 326 and 328 can coact with the diode 256, the resistor 264 and the potentiometer 266 to apply a voltage to the junction 309 which is truly proportional to the total amount of current flowing through the arc between the electrode and workpiece connected to the output terminals 222 and 254. The voltage applied to the junction 309 is applied to the base of transistor 794 in FIG. 6 by conductor 313 and resistor 792, and is applied to the input of the pre-amplifier 706 in FIG. 4 by conductor 340 and resistor 704. The positive voltage which is supplied to the movable contact 216 is supplied to the base of transistor 786 in FIG. 6 by conductor 332 and resistors 780 and 782. A conductor 334 is connected to the junction 242 and extends to the common return of the circuit of the electric welder and programming device. A capacitor 336 is connected between the conductors 332 and 334, and will tend to filter out any high frequency currents.

The numeral 342 denotes a choke which is connected to the serially-connected control windings 154, 168 and 182 of the magnetic amplifiers 150, 164 and 178—being connected to the lower terminal of the right-hand control winding 182. The lower end of the left-hand control winding 154 is connected to the common return of the circuit of the electric welder and programming device. A conductor 344 extends from the right-hand terminal of the choke 342 into and through FIG. 3 and to a junction 774 in FIG. 4.

FIG. 5 shows a voltage regulator which provides a precisely-regulated positive voltage of twenty-eight volts and also provides a precisely-regulated negative voltage of twenty-eight volts. A negative voltage of thirty-two volts is supplied to that voltage regulator by the conductor 140 which extends from the junction 134 in FIG. 1; and that conductor has junctions 350, 352, 354 and 356 therein, as shown by FIG. 5. A positive voltage of thirty-two volts is supplied to that voltage regulator by the conductor 136 which extends from the junction 132 in FIG. 1; and that conductor extends to a junction 382 in FIG. 5.

A resistor 358, a junction 362, and a resistor 360 connect the junction 350 with the collector of a PNP transistor 364. The emitter of that transistor is connected to the common return of the circuit by a junction 366. A diode 370 is connected between the junction 366 and the base of the transistor 364 by a junction 368; and that diode will protect that transistor against injury due to transients in the circuit.

The junction 362 is connected to the base of an NPN transistor 374, and the emitter of that transistor is connected to the junction 352 by a diode 372. The collector of that transistor is connected to the junction 382 by a resistor 376, a junction 380 and a resistor 378. The junction 380 is connected to the base of a PNP transistor 430; and the emitter of that transistor is connected to the junction 382 by a diode 432. The collector of the transistor 430 is connected to the conductor 140 by junctions 422 and 420, a resistor 428, a junction 424, a resistor 426, junctions 412 and 414, and a PNP transistor 398. That collector also is directly connected to the output terminal 442 of the voltage regulator of FIG. 5. A conductor 418 extends from that output terminal into FIGS. 2, 3, 4, 6 and 7. The emitter of the transistor 398 is connected to the output terminal 440 of the voltage regulator of FIG. 5 by the junction 414; and the conductor 416 extends from that output terminal into FIGS. 3, 6 and 7.

A resistor 410, a junction 406, and a Zener diode 408 are connected between the junctions 412 and 420. The junction 406 is connected to the base of a PNP transistor 390 by a resistor 404 and a junction 400; and the junction 400 is connected to the common return of the circuit by a diode 402. The emitter of the transistor 390 is connected directly to the common return of the circuit, and the collector of that transistor is connected to the conductor 140 by a resistor 386, a junction 388, a resistor 384 and the junction 354.

The junction 388 is connected directly to the base of a PNP transistor 392, and the collector of that transistor is connected to the junction 356 in the conductor 140. The emitter of that transistor is connected to the common return by a junction 394 and a resistor 396; and the junction 394 is connected directly to the base of the transistor 398. The collector of that transistor is connected directly to the conductor 140. A capacitor 434 and a capacitor 436 are connected in series between the output terminals 440 and 442; and the adjacent terminals of those capacitors are connected to the common return of the circuit by a junction 438.

The numeral 443 in FIG. 3 denotes a fixed relay contact, and that contact is connected to the positive terminal 442 of the voltage regulator of FIG. 5 by a resistor 439 and by the conductor 418. A movable relay contact 446 normally engages the fixed contact 443 but can be moved into engagement with a fixed relay contact 444. The movable contact 446 is connected to one of the inputs of an amplifier 448 by junctions 456 and 489. The details of an amplifier which can be used as the amplifier 448 are shown in FIG. 7. The other input of the amplifier 448 is connected to the movable contact of a potentiometer 462. The right-hand terminal of that potentiometer is connected to the common return of the circuit, and the left-hand terminal of that potentiometer is connected to the negative terminal 440 of the voltage regulator of FIG. 5 by a resistor 460 and by the conductor 416. The output of the amplifier 448 is connected to the cathode of a diode 558 and to the upper end of a Zener diode 482 by junctions 458 and 480. A parallel-connected capacitor 454 and diode 452 connect the junction 458 with the junction 456; and the anode of that diode is connected to the junction 458.

The lower end of the Zener diode 482 is connected to the positive terminal 442 of the voltage regulator of FIG. 5 by junctions 484 and 485, a resistor 486, and the conductor 418. A diode 488 is connected between the junction 484 and the junction 489. The junction 485 is connected to one of the inputs of an amplifier 490 by a resistor 492 and a junction 494. The amplifier 490 can be identical to the amplifier shown in FIG. 7, and hence can be identical to the amplifier 448. The other input of the amplifier 490 is connected to the movable contact of a potentiometer 498; and that potentiometer has the right-hand terminal thereof connected to the common return of the circuit. The left-hand terminal of that potentiometer is connected to the negative terminal 440 of the voltage regulator of FIG. 5 by a resistor 496 and the conductor 416. The output of the amplifier 490 is connected to the cathode of a diode 514 by junctions 506 and 508. The junction 506 is connected to the positive terminal 442 of the voltage regulator of FIG. 5 by a resistor 502 and the conductor 418. A resistor 510 and an adjustable resistor 512 are connected between the junction 508 and the junction 494.

The anode of the diode 514 is connected to the movable contact 516 which is mounted adjacent fixed contacts 518 and 520. The fixed contact 520 is connected to one terminal of a potentiometer 522, and the other terminal of that potentiometer is connected to the common return of the circuit. The fixed contact 518 is connected to one terminal of a potentiometer 524, and the other terminal of that potentiometer is connected to the common return of the circuit. The movable contact of the potentiometer 522 is connected to a fixed contact 530; and a movable contact 528 is selectively engageable with that fixed contact or with a fixed contact 526. The fixed contact 526 is connected to the movable contact of the potentiometer 524; and movable contact 528 is connected to a conductor 536 by a resistor 532 and a junction 534. The movable contacts 516 and 528 are "ganged" together, as indicated by the dotted line 529 in FIG. 3. Those movable contacts and the adjacent fixed contacts constitute a "Remote-Local" switch. A knob 531 is provided to enable the movable contacts 516 and 528 to be shifted into and out of their upper and lower positions. In their upper positions, those movable contacts will, respectively, engage the fixed contacts 520 and 530; and, in their lower positions, those movable contacts will, respectively, engage the fixed contacts 518 and 526. The knob 531 will be accessible from the exterior of the programming device of the present invention. The junction 534 is connected to a movable relay contact 546 by a resistor 544. That movable relay contact is adjacent fixed relay contacts 548 and 550. The fixed relay contact 548 is connected to the movable contact of a potentiometer 552 which has the right-hand terminal thereof connected to the common return of the circuit. The other terminal of that potentiometer is connected to the anode of the diode 558 by a junction 556. The fixed relay contact 550 is connected to the movable contact of a potentiometer 554 that has the right-hand terminal thereof connected to the common return of the circuit. The other terminal of that potentiometer is connected to the junction 556.

The movable relay contact 546 is "ganged" with a movable relay contact 470, as indicated by dotted lines in FIG. 3. Whenever the movable relay contact 546 is in engagement with the fixed relay contact 548, the movable relay contact 470 will be in engagement wtih the fixed relay contact 468. Whenever the movable relay contact 546 is in engagement with the fixed relay contact 550, the movable relay contact 470 will be in engagement with the fixed relay contact 472.

The fixed relay contact 468 is connected to the negative terminal 440 of the voltage regulator of FIG. 5 by a resistor 466, an adjustable resistor 464, and the conductor 416. The fixed relay contact 472 is connected to the positive terminal 442 of the voltage regulator of FIG. 5 by a resistor 476, an adjustable resistor 474, and the conductor 418.

The numeral 560 denotes a resistor in the upper right-hand portion of FIG. 3; and one terminal of that resistor is connected to the negative terminal 440 of the voltage regulator of FIG. 5 by the conductor 416. The other terminal of that resistor is connected to one terminal of a potentiometer 562; and the other terminal of that potentiometer is connected to the common return of the circuit. A resistor 564 is connected to the movable contact of the potentiometer 562; and a conductor 566 extends from that resistor to one of the inputs of an amplifier 658 in FIG. 4. The conductor 536 extends from the junction 534 in FIG. 3 to a junction 676 in FIG. 4, and thence to another input of the amplifier 658.

The numeral 664 in FIG. 4 denotes a junction which is connected to the output of the amplifier 658. That amplifier can be identical to the amplifier shown in FIG. 7, and can thus be identical to the amplifiers 448 and 490. The junction 664 is connected to the positive terminal 442 of the voltage regulator of FIG. 5, either through a Zener diode 666, a junction 668, a resistor 684, a junction 686 and the conductor 418 or by a resistor 678, a potentiometer 680, a resistor 682, junction 686, and the conductor 418. The numeral 672 denotes a resistor which coacts with an adjustable resistor 674 to constitute a feed back circuit that is connected between the junction 676 and a junction 670.

A resistor 688 and junctions 690, 702, 710, 1010 and 714 connect the junction 670 with one of the inputs of the pre-amplifier 706. That pre-amplifier can be identical to the amplifier shown in FIG. 7, and can thus be identical to the amplifiers 448, 490 and 658. A resistor 698, an adjustable resistor 696, a junction 694, and a diode 692 are connected between the junction 690 and the movable contact of the potentiometer 680. A resistor 700 is connected between the junction 694 and the common return of the circuit. The numeral 708 denotes a conductor which connects the other input of the pre-amplifier 706 with the column return of the circuit. A Zener diode 720 is connected in parallel with the pre-amplifier 706 by the junction 714 and a junction 722. A Zener diode 724 and junctions 726 and 728 connect the junction 722 with a junction 754. A resistor 730 and a capacitor 732 are connected in series between the junction 710 and the junction 728.

Four PNP transistors 738, 740, 742 and 744 have the bases thereof connected to the junction 754 by junctions 756 and 758. The collectors of those transistors are connected to the negative terminal 134 in FIG. 1 by the conductor 130, a resistor 746, and various of the junctions 748, 750 and 752. The emitters of those transistors are connected to the positive terminal 132 in FIG. 1 by the conductor 128, a junction 779, a resistor 776, a junction 770, one or more of junctions 768, 772 and 774 and, respectively, by resistors 760, 762, 764 and 766. A resistor 778 connects the junction 726 with the junction 779, and thus to the positive terminal 132 in FIG. 1, FIG. 7 shows in detail an amplifier which can be used as the integrating operational amplifier 448 of FIG. 3, as the inverting operational amplifier 490 of FIG. 3, as the summing amplifier 658 of FIG. 4, and as the pre-amplifier 706 of FIG. 4. The amplifier of FIG. 7 is generally denoted by the numeral 894, and it has input terminals 896 and 898. The input terminals 896 and 898 will, respectively, be connected to the junction 489 and to the movable contact of the potentiometer 462 in FIG. 3 when the amplifier 894 is used as the integrating operational amplifier 448. The input terminals 896 and 898 will, respectively, be connected to the junction 494 and to the movable contact of the potentiometer 498 in FIG. 3 when the amplifier 894 is used as the inverting operational amplifier 490. The input terminals 896 and 898 will, respectively, be connected to the junction 676 and to the conductor 566 in FIG. 4 when the amplifier 894 is used as the summing amplifier 658; and those input terminals will, respectively, be connected to the junction 714 and to the conductor 708 in FIG. 4 when the amplifier 894 is used as the pre-amplifier 706.

The input terminal 896 is connected to the base of an NPN transistor 900, and the input terminal 898 is connected to the base of an NPN transistor 902. The emitters of those transistors are connected, respectively, to a junction 944 by a resistor 940 and by a resistor 942. That junction is connected to the negative terminal 440 of the voltage regulator of FIG. 5 by a resistor 946, a junction 948, a resistor 950, junctions 952, 954, 956 and 957, and the conductor 416. The junction 948 is connected to the common return of the circuit by a capacitor 958. The collector of the transistor 900 is connected to a junction 918 by a junction 908 and a resistor 916, and the collector of the transistor 902 is connected to that junction by a junction 910 and a resistor 911. The junction 918 is connected to the positive terminal 442 of the voltage regulator of FIG. 5 by a junction 919, a resistor 920, junctions 922 and 924, and the conductor 418. The junction 919 is connected to the common return of the circuit by a capacitor 967.

The junction 908 is connected to the base of a PNP transistor 904, and the junction 910 is connected to the base of a PNP transistor 906. The emitters of those transistors are, respectively, connected to a junction 928 by a resistor 930 and a resistor 932. That junction is connected to the positive terminal 442 of the voltage regulator of FIG. 5 by a resistor 926, junctions 922 and 924, and the conductor 418. The collector of the transistor 904 is connected to the junction 954 by a resistor 960 and the junction 952; and the collector of the transistor 906 is connected to the junction 954 by a junction 912 and a resistor 962. As previously indicated, the junction 954 is connected to the negative terminal 440 of the voltage regulator of FIG. 5.

A junction 965 connects the junction 912 with the base of an NPN transistor 914; and a capacitor 966 extends between the junction 965 and the common return of the circuit. The collector of the transistor 914 is connected to the positive terminal 442 of the voltage regulator of FIG. 5 by a junction 936, a resistor 934, the junction 924, and the conductor 418. A resistor 938 is connected between the junction 936 and the common return of the circuit. A junction 963 and a resistor 964 connect the emitter of the transistor 914 to the junction 956; and, as previously explained, that junction is connected to the negative terminal 440 of the voltage regulator of FIG. 5. The base of a PNP transistor 970 is connected to the junction 963; and the collector of that transistor is connected to the negative terminal 440 of the voltage regulator of FIG. 5 by a resistor 972, junction 957, and the conductor 416. The emitter of that transistor extends to an output terminal 968.

It will be noted that the amplifier 894 of FIG. 7 has two input terminals and has one output terminal; and each of the amplifiers 448, 490, 658 and 706, in FIGS. 3 and 4, is shown as having two input terminals and one output terminal. The amplifier 894 is connected to the positive terminal 442 of the voltage regulator of FIG. 5 by the conductor 418 and is connected to the negative terminal 440 of that amplifier by the conductor 416; but, for the sake of clarity, those connections have not been shown for the amplifiers 448, 490, 658 and 706 in FIGS. 3 and 4.

The numeral 553 denotes a dial for the "Initial" welding current potentiometer 552, the numeral 525 denotes a dial for the "Second" welding current potentiometer 524, and the numeral 555 denotes a dial for the "Finish" welding current potentiometer 554. Numeral 523 denotes a dial for the welding current potentiometer 522. The numerals 465 and 475 denote dials for the adjustable resistors 464 and 474, respectively.

Amplifier 448 and amplifier 490 in FIG. 3 coact with their associated circuitry, and with relay contacts 443, 444, 446, 468, 470 and 472 and with adjustable resistors 464 and 474, to establish a voltage of about minus one-quarter of a volt at the cathode of diode 558 and a voltage of about minus nineteen and one-quarter volts at the cathode of diode 514 or to establish a voltage of about minus one-quarter of a volt at the cathode of diode 514 and a voltage of about minus nineteen and one-quarter volts at the cathode of diode 558. The potentiometers 522, 524, 552 and 554 coact with the contacts 516, 518, 520, 526, 528, 530, 546, 548 and 550 to supply selected reference voltages to the amplifier 658 in FIG. 4. The amplifier 706 responds to signals from the amplifier 658 and from the resistors 322, 324, 326 and 328 in FIG. 2 to supply a signal to the amplifier which includes the transistors 738, 740, 742 and 744. The latter amplifier then supplies a signal to the control windings of the magnetic amplifiers 150, 164 and 178 to control the outputs of those magnetic amplifiers, all as described in detail in the said Hoyt application.

The voltage regulator of FIG. 5 receives thirty-two volts D.C. from the junctions 132 and 134 in FIG. 1, and provides a regulated positive twenty-eight volts at the junction 442 while providing a regulated negative twenty-eight volts at the junction 440. The amplifiers 448, 490, 658 and 706 can have the components and operation of the amplifier 894 in FIG. 7.

The present invention modifies the control system of the said Hoyt by eliminating that portion of FIG. 6 of the said Hoyt application which can provide an increase in output for a predetermined period of time, by adding a further feed-back loop to FIG. 4, and by adding a preset signal which is selectively applied to the input of the amplifier 706. Specifically, the anode of the diode 810 in FIG. 6 is connected to one terminal of a relay coil 1001 by a conductor 1002 instead of being selectively connectable to the input of the amplifier 706 in FIG. 4. The other terminal of that relay coil is connected to the common return of the circuit, and that relay coil controls normally-open relay contacts 1004 and 1006 in FIG. 4. Those relay contacts are connected to the input of the amplifier 706 by a conductor 1008, a junction 1010, and the junction 714. A resistor 1012, a conductor 1014 and a junction 1016 connect the relay contacts 1004 to resistor 760 and junction 768. A potentiometer 1018 in FIG. 4 has the upper terminal thereof connected to the positive terminal 442 of the voltage regulator of FIG. 5 by conductor 418, and has the lower terminal thereof connected to the negative terminal 440 of that voltage regulator by conductor 416. The movable contact of that potentiometer is connected to the relay contacts 1006 by a resistor 1020; and that movable contact can be set to apply positive or negative reference voltages of different values to the pre-amplifier 706.

As pointed out in the said Hoyt application, a positive voltage of about eighty-two volts will, prior to the time an arc is initiated, appear at the junction 214 in FIG. 2; and the conductor 332 will apply that voltage to the left-hand terminal of the resistor 780 in FIG. 6. The upper terminal of the resistor 812 is connected to the negative terminal 440 of the voltage regulator of FIG. 5 by the junctions 814, 818 and 820 and by conductor 416; and hence the resistors 780, 782 and 812 constitute a voltage divider which is connected between a positive voltage that is initially eight-two volts and a negative voltage that is always twenty-eight volts. The anode of the dode 790 is connected to the junction 784, intermediate the resistors 782 and 812, by the junction 788; and the cathode of that diode is connected to the common return of the circuit. The values of the resistors 780, 782 and 812 are selected so the voltage at the junction 784, and hence at the base of the transistor 786, will be positive as long as the voltage at the junction 214 in FIG. 2 is above about fifty volts; and the diode 790 will keep that positive voltage at a value of less than one volt. The overall result is that before an arc is initiated, the transistor 786 will be non-conductive.

The lower terminal of the resistor 338 in FIG. 2 is connected to the positive terminal 442 of the voltage regulator in FIG. 5 by the conductor 418; and the upper terminal of that resistor is connected to the junction 330 by junction 311, resistor 310, and junction 309. Junctions 234 and 236, parallel-connected resistor 264 and potentiometer 266, conductor 306, output terminals 278, 290 and 302, junctions 314 and 320 adjustable resistor 322, and resistors 324, 326 and 328 connect the common return of the circuit to the junction 330. Prior to the initiation of an arc, no current will flow through the primary windings 270, 282 and 294 of the current transformers 272, 284 and 296; and, for lack of current, no voltages will appear across the output terminals of the bridge rectifiers 276, 288 and 300. As a result, before an arc is initiated, the parallel-connected resistor 264 and potentiometer 266, adjustable resistor, 322 and resistors 324, 326, 328, 310 and 338 will constitute a voltage divider between the positive terminal 442 of the voltage regulator and the common return of the circuit; and the voltage at the junction 311, and hence at the base of the transistor 794 in FIG. 6, will be positive relative to the emitter of that transistor. Consequently, before an arc is initiated, the transistor 794 will be non-conductive. The overall result is that both of the input transistors 786 and 794 of the ignition circuit 312 will be non-conductive prior to the time an arc is initiated. Once an arc has been initiated, that arc will constitute a finite impedance across the output terminals 222 and 254; and the voltage across those output terminals will start decreasing. Also, the output windings 152, 166 and 180 of the magnetic amplifiers 150, 164 and 178 will start supplying current to that arc; and that current will be large enough to enable the secondary windings 274, 286 and 298 to cause appreciable voltages to appear across the output terminals of the bridge rectifiers 276, 288 and 300. Those voltages will make the junction 330 negative relative to the conductor 306; and the valves of parallel-connected resistor 264 and potentiometer 266, of adjustable resistor 322, and of resistors 324, 326, 328, 310 and 338 are selected so even very small values of current from the output windings 152, 166 and 180 of the magnetic amplifiers 150, 164 and 178 will make the voltage at the junction 311, and hence at the base of transistor 794, negative relative to the common return of the circuit. The increasing current from the output windings 152, 166 and 180 of the magnetic amplifiers 150, 164 and 178 may cause the transistor 794 to become conductive before the decreasing voltage across the output terminals 222 and 254 causes the transistor 786 to become conductive or the decreasing voltage across the output terminals 222 and 254 may cause the transistor 786 to become conductive before the increasing current from the output windings 152, 166 and 180 of the magnetic amplifiers 150, 164 and 178 causes the transistor 794 to become conductive, but one or the other or both of the transistors 786 and 794 will become conductive as soon as an arc has been initiated.

The transistor 800 will be fully conductive whenever both of the transistors 786 and 794 are non-conductive; and, as long as the transistor 800 is fully conductive, the voltage at the junction 806 will be quite negative, and that negative voltage will be directly applied to the cathode of the diode 810. The relay coil 1001 will apply ground voltage to the anode of that diode; and, consequently, as long as transistor 800 is fully conductive, relay coil 1001 will be energized and will hold relay contacts 1004 and 1006 in FIG. 4 closed. All of this means that prior to the initiation of an arc, relay contacts 1004 will be held closed and will coact with resistor 1012 to provide negative feed-back for the combination of the multi-transistor amplifier and the pre-amplifier 706. Further, relay contacts 1006 will be held closed and will coact with resistor 1020 and with potentiometer 1018 to apply a predetermined reference signal to the input of pre-amplifier 706. The negative feed-back which resistor 1012 and relay contacts 1004 apply to the input of pre-amplifier 706 will limit the forward gain of the control system, and that limitation makes it possible for the magnetic amplifiers 150, 164 and 178 to supply a voltage to the output terminals 222 and 254 while keeping those magnetic amplifiers from being driven to saturation. This is desirable because it will enable those magnetic amplifiers to provide a voltage differential between the electrode and workpiece that will facilitate the establishing of an arc but that will not be so high as to cause destruction of or injury to that workpiece or electrode upon the initiation of an arc.

The pre-amplifier 706 and the multi-transistor amplifier could, if desired, be combined into one pre-amplifier; and, for convenience, pre-amplifier 706 and the multi-transistor amplifier will be regarded as a single pre-amplifier. Whenever the relay contacts 1004 are closed, resistor 1012 and those relay contacts constitute a closed loop for that pre-amplifier. As a result, whenever the relay contacts 1004 are closed, the combination of pre-amplifier 706 and the multi-transistor amplifier can be considered to be a closed loop pre-amplifier.

The reference signal which the potentiometer 1018, the resistor 1020, and the relay contacts 1006 apply to the pre-amplifier, and the signal which the amplifier 658 applies to that pre-amplifier, will control the current output of the magnetic amplifiers as the arc is being initiated. The signal which the amplifier 658 applies to the pre-amplifier, as the arc is being initiated, is largely determined by the setting of the potentiometer 552 in FIG. 3; and that signal will enable that pre-amplifier to cause the magnetic amplifiers to provide the desired level of initial welding current after the relay contacts 1006 are permitted to open. The reference signal which the potentiometer 1018, the resistor 1020, and the relay contacts 1006 apply to the pre-amplifier will be set to add to, subtract from, or leave unchanged the signal which the amplifier 658 applies to that pre-amplifier. That reference signal can, and usually will, be set to cause the pre-amplifier and the magnetic amplifiers to keep the initial value of current supplied to the electrode and the workpiece below a level at which that current could destroy or injure that workpiece or that electrode. Where the workpiece is thin, the initial value of current should be quite low; but where that workpiece is thick, that initial value of current should be high. Where that workpiece is very thick, that initial value of current can be at the saturation level. As a result, the control system makes it possible to weld objects of many different thicknesses.

Until such time as an arc is initiated, the relay coil 1001 will remain energized and will hold the relay contacts 1004 and 1006 closed. However, once an arc has been initiated, either or both of the transistors 786 and 794 in FIG. 6 will become conductive; and, thereupon, the voltage at the junction 802, and hence at the base of the transistors 798, will move in the positive direction. That transistor will then become less conductive; and the resulting decreased voltage drop across the resistor 828 will cause the voltage at the junction 804, and hence at the base of the transistor 800, to move in the positive direction. The transistor 800 will thereupon become less conductive; and the resulting decreased voltage drop across the resistor 830 will cause the voltage at junction 806, and hence at the left-hand terminal of relay coil 1001, to move closer to ground. As a result, that relay coil will be unable to continue to hold relay contacts 1004 and 1006 closed; and those contacts will open. At such time, further feed-back through resistor 1012 in FIG. 4 will be prevented, and the reference signal which had been supplied to the pre-amplifier by potentiometer 1018, resistor 1020, and relay contacts 1006 will be removed. Thereupon, and as long as the arc is maintained, the electric welder and programming device will supply welding current at the levels set by potentiometers 522, 524, 552 and 554, and will operate independently of the ignition circuit of FIG. 6 and of resistors 1012 and 1020 and potentiometer 1018 of FIG. 4.

The value of resistor 1012 is selected so the product of the gain of the closed loop pre-amplifier multiplied by the voltage gain of magnetic amplifiers 150, 164 and 178 closely approximates the closed loop voltage gain of both that pre-amplifier and those magnetic amplifiers after an arc has been initiated. That value of resistor 1012 enables the amount of feedback around the closed loop pre-amplifier, prior to the time an arc is initated, to equal the current gain of the magnetic amplifiers times the current feedback to the input of the pre-amplifier after an arc has been initiated and relay contacts 1004 have opened. This is desirable because it enables the output of the pre-amplifier, when the movable contact of potentiometer 1018 in FIG. 4 is at its middle position and before an arc is initiated, to be about the same as the output of that pre-amplifier after an arc has been established. Consequently, the input signal to the magnetic amplifiers and hence the output voltage of those magnetic amplifiers, will, before an arc is initiated, be about the same as the input signal to, and output voltage of, those magnetic amplifiers after an arc is initiated and established.

The setting of the movable contact of potentiometer 1018 can be adjusted to adjust the output of the close loop pre-amplifier so the output voltage of magnetic amplifiers 150, 164 and 178, before an arc is initiated, will equal, exceed, or be less than the output voltage of those magnetic amplifiers after an arc has been initiated and established. Where the output of the pre-amplifier, before an arc is initiated, is greater than the output of that pre-amplifier after an arc has been established, the current that flows through the arc will initially be greater than that set by the potentiometer 552. However, as soon as the relay coil 1001 permits the relay contacts 1004 and 1006 to re-open, that current will start decreasing to the level set by the potentiometer 552. Where the output of the pre-amplifier, before an arc is initiated, is smaller than the output of that pre-amplifier after an arc has been established, the current that flows through the arc will initially be smaller than that set by the potentiometer 552. However, as soon as the relay coil 1001 permits the relay contacts 1004 and 1006 to re-open, that current will start increasing to the level set by the potentiometer 552.

The transistor 786 was rendered non-conductive, prior to the initiation of the arc, because a positive voltage of about eighty-two volts appeared at the junction 214 in FIG. 2, and because the conductor 332 applied that voltage to the left-hand terminal of the resistor 780. The transistor 794 was rendered non-conductive, prior to the initiation of the arc, because no current was flowing through the primary windings 270, 282 and 294 of the current transformers 272, 284 and 296; and, for the lack of such current flow no voltage was developed at the junction 330 in FIG. 2. However, once the arc was initiated and established, the voltage at the junction 214 in FIG. 2 dropped down to a value considerably less than eighty-two volts; and a voltage appeared at the junction 330 in FIG. 2. Consequently, once the arc was initiated and established, the transistors 786 and 794 became conductive and permitted the relay coil 1001 to release the relay contacts 1004 and 1006 in FIG. 4.

The transistors 786 and 794 constitute an "and" gate; and they will not again permit the transistor 800 to become fully conductive until both of them again become non-conductive. Because one of the other or both of the transistors 786 and 794 will remain conductive as long as the arc remains established, the transistor 800 will be unable to cause the relay coil 1001 to close the relay contacts 1004 and 1006 until the arc becomes extinguished. However, after the arc has become extinguished, the voltage at the junction 214 in FIG. 2 will again rise to about eighty-two volts, and the voltage at the junction 330 in FIG. 2 will again disappear; and, at such time, the transistors 786 and 794 will again become non-conductive. The transistor 800 will then become fully conductive and cause the relay coil 1001 to close the relay contacts 1004 and 1006. In this way, the control system provided by the present invention enables the resistor 1012 and the relay contacts 1004 to provide negative feedback, and enables potentiometer 1018, the resistor 1020, and the relay contacts 1006 to supply a reference signal, prior to and during the establishing of an arc, but thereafter enables the control system to operate independently of that negative feedback and of that reference signal as long as the arc remains established.

The potentiometer 1018, the resistor 1020, and the relay contacts 1006 are very useful and desirable in developing and supplying a reference signal to the input of the pre-amplifier. However, the potentiometer 1018, the resistor 1020, and the relay contacts 1006 could be eliminated by making the resistor 1012 an adjustable resistor. In such event, the resistor 1012 could be adjusted to make the output voltage of the magnetic amplifiers 150, 164 and 178, prior to the time an arc is initiated and established, less than, equal to, or greater than the output voltage of those magnetic amplifiers after an arc has been initiated and established; thereby approximating the control functions that can be provided by the reference voltage supplied by potentiometer 1018 and by the negative feedback applied by the fixed resistor 1012. The use of potentiometer 1018, resistor 1020, and relay contacts 1006 in addition to the fixed resistor 1012 and relay contacts 1004 is more desirable than the use of relay contacts 1004 and an adjustable resistor 1012; because the position of the movable contact of potentiometer 1018 can be adjusted without requiring a change in the setting of the movable contact of potentiometer 552, whereas an appreciable change in the setting of an adjustable resistor 1012 would require a change in the setting of the movable contact of potentiometer 552.

The magnetic amplifiers 150, 164 and 178 constitute useful and desirable variable output sources; but other variable output sources could be used. Variable reactors, electron tubes, transistors, controlled rectifiers, and other variable output elements could be used to constitute a variable output source for the control system of the present invention.

The relay coil 1001 and the relay contacts 1004 and 1006 constitute an inexpensive and effective means of selectively connecting and disconnecting the resistors 1012 and 1020 to and from the pre-amplifier 706. However, where desired, solid state switch circuitry could be used to replace the relay coil 1001 and the relay contacts 1004 and 1006.

The control system of the said Hoyt application employs current feedback loops; but the control system of the present invention would be usable with the control system of the said Hoyt application even if the latter control system were to use a voltage feedback loop. For example, the control system of the present invention would be usable with the control system of the said Hoyt application even if the latter control system were to have the input of an operational amplifier connected to the junction 214 of FIG. 2 by a resistor, and were to have the conductor 340 disconnected from the junction 309 in FIG. 2 and connected to the output of said operational amplifier. Furthermore, the control system of the present invention is usable with control systems for electric welders other than the control system of the said Hoyt application.

The use of the ignition circuit of FIG. 6 to control the relay coil 1001 is desirable; but that relay coil could be controlled by other circuits. For example, that relay coil could be controlled by a circuit which sensed the voltage across the terminals 222 and 254; and which kept that coil energized as long as that voltage exceeded a predetermined value and which permitted that coil to become de-energized whenever that voltage fell below that predetermined value. Thus, as shown by FIG. 9, the relay coil 1001 and an adjustable resistor 1100 can be connected in series between the junction 212 in the conductor 195 and the junction 240 in the conductor 230 of FIG. 2. The adjustable resistor 1100 will be adjusted to cause the relay coil 1001 to hold the relay contacts 1004 and 1006 of FIG. 4 closed as long as the voltage between the junctions 212 and 240 exceeds said predetermined value, but to permit those relay contacts to re-open when that voltage falls below that predetermined value.

It is desirable to apply the negative feedback and the reference signal to the input of the pre-amplifier. However, if desired, the negative feedback and the reference signal could be applied directly to the inputs of the magnetic amplifiers 150, 164 and 178. However, the increased power that would be necessary, would make such an arrangement less efficient than the arrangement shown and described herein.

Whereas the drawing and accompanying description have shown and described a preferred embodiment of the present invention it should be apparent to those skilled in the art that various changes may be made in the form of the invention without affecting the scope thereof.

What I claim is:

1. In a control system for an electric welder which has a variable output source, a pre-amplifier, output terminals, and a connection from the output of said pre-amplifier to said variable output source to enable said pre-amplifier to bias said variable output source the improvement which comprises:
   (a) a negative feedback loop around said pre-amplifier to make said pre-amplifier a closed loop pre-amplifier,
   (b) relay contacts in said negative feedback loop,
   (c) a voltage reference,
   (d) further relay contacts intermediate said voltage reference and said input of said pre-amplifier,
   (e) a relay coil to close the first said and said further relay contacts, and
   (f) a sensing circuit that energizes said relay coil to cause said relay coil to close the first said and said further relay contacts prior to the initiation of an arc and that de-energizes said relay coil to open the first said and said further relay contacts after an arc has been initiated,
   (g) said negative feedback loop, while the first said relay contacts are closed prior to the initiation of an arc, being adapted to supply sufficient negative feedback to said preamplifier to keep said variable output source from becoming saturated,

17

(h) said voltage reference being adjustable to selectively apply different values of positive or negative D.C. voltage to the input of said pre-amplifier, while said further relay contacts are closed prior to the initiation of an arc, and thereby enable said pre-amplifier to bias said variable output source to provide a desired output level as an arc is being initiated, (i) said negative feedback loop, whenever the first said and said further relay contacts are closed and said voltage reference is applying essentially zero voltage to the input of said pre-amplifier, enabling the output voltage of said variable output source, before an arc is initiated, to closely approximate the output voltage of said variable output source after an arc has been initiated and established, (j) said sensing circuit de-energizing said relay coil to permit the first said and said further relay contacts to open after an arc has been initiated and to keep said relay coil from closing the first said and said further relay contacts as long as said arc is established, (k) said voltage reference including a potentiometer that has one terminal thereof connected to a positive D.C. voltage and that has another terminal thereof connected to a negative D.C. voltage, (l) said sensing circuit including gating means responsive to the voltage across, and the current flowing through, said output terminals, (m) said "gating means causing said sensing circuit to energize said relay coil and thereby cause said relay coil to close the first said and said further relay contacts when, prior to the initiation of an arc, the voltage across said output terminals rises to a predetermined value and the current flowing through said output terminals falls to a predetermined level, (n) said gating means permitting said sensing circuit to de-energize said relay coil and thereby permit the first said and said further relay contacts to open when the voltage across said output terminals falls to a second predetermined value or the current flowing through said output terminals rises to a second predetermined level, (o) said variable output source being a magnetic amplifier that can vary the current supplied to said output terminals.

2. In a control system for an electric welder which has a variable output source responsive to a variable amplitude input signal and which saturates above a predetermined amplitude of said input signal, a pre-amplifier, and a connection from the output of said pre-amplifier to said variable output source, the improvement which comprises:

(a) a negative feed-back loop around said pre-amplifier to make said pre-amplifier a closed loop pre-amplifier, (b) relay contacts in said negative feed-back loop, (c) a voltage reference, (d) further relay contacts intermediate said voltage reference and said input of said pre-amplifier, (e) a relay coil to close the first said and said further relay contacts, and (f) a sensing circuit that has control means causing said relay coil to close the first said and said further relay contacts prior to the initiation of an arc and to open the first said and said further relay contacts after an arc has been initiated and to keep said relay coil from closing the first said and said further relay contacts as long as said arc is established, (g) said negative feed-back loop, while the first said relay contacts are closed prior to the initiation of an arc, having means adapted to supply sufficient negative feed-back to said pre-amplifier to enable said pre-amplifier to keep said variable output source from becoming saturated, (h) said voltage reference being adjustable to selectively apply different values of positive or negative

18

D.C. voltage to the input of said pre-amplifier, while said further relay contacts are closed prior to the initiation of an arc, and thereby enable said pre-amplifier to bias said variable output source to provide a desired output level as an arc is being initiated, (i) said negative feed-back loop, whenever the first said and said further relay contacts are closed and said voltage reference is applying essentially zero voltage to the input of said pre-amplifier, enabling the outut voltage of said variable output source, before an arc is initiated, to closely approximate the output voltage of said variable output source after an arc has been initiated and established, (j) said voltage reference including a potentiometer that has one terminal thereof connected to a positive D.C. voltage and that has another terminal thereof connected to a negative D.C. voltage.

3. In a control system for an electric welder which has a variable output source responsive to a variable amplitude input signal and which saturates above a predetermined amplitude of said input signal, a pre-amplifier, and a connection from the output of said pre-amplifier to said variable output source, the improvement which comprises:

(a) a negative feed-back loop around said pre-amplifier, (b) relay contacts in said negative feed-back loop, (c) a voltage reference, (d) further relay contacts intermediate said voltage reference and said input of said pre-amplifier, (e) a relay coil to close the first said and said further relay contacts, and (f) a sensing circuit that has control means causing said relay coil to close the first said and said further relay contacts prior to the initiation of an arc and to open the first said and said further relay contacts after an arc has been initiated and to keep said relay coil from closing the first said and said further relay contacts as long as said arc is established, (g) said negative feed-back loop, while the first said relay contacts are closed prior to the initiation of an arc, having means adapted to supply sufficient negative feed-back to said pre-amplifier to enable said pre-amplifier to keep the output voltage of said variable output source at a desired initial level, (h) said voltage reference being adjustable to selectively apply different values of positive or negative D.C. voltage to the input of said pre-amplifier, while said further relay contacts are closed prior to the initiation of an arc, and thereby enable said pre-amplifier to bias said variable output source to provide a desired output voltage as an arc is being initiated.

4. In a control system for an electric welder which has a variable output source responsive to a variable amplitude input signal and which saturates above a predetermined amplitude of said input signal, a pre-amplifier, and a connection from the output of said pre-amplifier to said variable output source, the improvement which comprises:

(a) a feed-back loop around said pre-amplifier, (b) relay contacts in said feed-back loop, (c) a voltage reference, (d) further relay contacts intermediate said voltage reference and the input of said variable output source that can be closed to enable said voltage reference to affect the bias of said variable output source, (e) a relay coil to close the first said and said further relay contacts, and (f) a sensing circuit having means that causes said relay coil to close the first said and said further relay contacts prior to the initiation of an arc and to open the first said and said further relay contacts after an arc has been initiated and to keep said relay coil from closing the first said and said further relay contacts as long as said arc is established, (g) said feed-back loop, while the first said relay contacts are closed prior to the initiation of an arc, having means adapted to supply sufficient feed-back to said pre-amplifier to enable said pre-amplifier to keep the output voltage of said variable output source at a desired initial level, 5. In a control system for an electric welder which has a variable output source, responsive to a variable amplitude input signal and which saturates above a predetermined amplitude of said input signal, a pre-amplifier, and a connection from the output of said pre-amplifier to the improvement which comprises:
 (a) a feed-back loop around said pre-amplifier,
 (b) conduction-controlling means in said feed-back loop,
 (c) a voltage reference,
 (d) further conduction-controlling means intermediate said voltage reference and the input of said variable output source that can be rendered conductive to enable said voltage reference to affect the bias of said variable output source,
 (e) a sensing circuit having means that causes the first said and said further conduction-controlling means to conduct current prior to the initiation of an arc and that causes the first said and said further conduction-controlling means to become non-conductive after an arc has been initiated and keeping the first said and said further conduction-controlling means non-conductive as long as said arc is established.
 (f) said feed-back loop, while the first said conduction-controlling means is conductive prior to the initiation of an arc, having means adapted to supply sufficient feed-back to said pre-amplifier to enable said pre-amplifier to keep the output voltage of said variable output source at a desired initial level.

6. In a control system for an electric welder which has a variable output source, responsive to a variable amplitude input signal and which saturates above a predetermined amplitude of said input signal, a pre-amplifier, and a connection from the output of said pre-amplifier to said variable output source, the improvement which comprises:
 (a) a feed-back loop around said pre-amplifier to make said pre-amplifier a closed loop pre-amplifier,
 (b) conduction-controlling means in said feed-back loop,
 (c) a sensing circuit having means that causes said conduction-controlling means to conduct current prior to the initiation of an arc and that causes said conduction-controlling means to become non-conductive after an arc has been initiated, and keeping said conduction controlling means non-conductive as long as said arc is established.
 (d) said feed-back loop, while said conduction-controlling means is conductive prior to the initiation of an arc, having means adapted to supply sufficient feed-back to said pre-amplifier to enable said pre-amplifier to keep the output voltage of said variable output source at a desired initial level,
 (e) said feed-back loop including an adjustable resistor,
 (f) said adjustable resistor in said feed-back loop being adjustable to make the output voltage of said variable output source, prior to the initiation of an arc, less than, equal to, or greater than the output voltage of said variable output source after an arc has been initiated.

7. In a control system for an electric welder which has a variable output source, responsive to a variable amplitude input signal and which saturates above a predetermined amplitude of said input signal, a pre-amplifier, and a connection from the output of said pre-amplifier to said variable output source, the improvement which comprises:
 (a) a feed-back loop around said pre-amplifier,
 (b) conduction-controlling means in said feed-back loop, and
 (c) a sensing circuit having means that causes said conduction-controlling means to conduct current or to become non-conductive after an arc has been initiated and keeping said conduction controlling means non-conductive as long as said arc is established.
 (d) said feed-back loop having means adapted, while said conduction-controlling means is conductive, to supply sufficient feed-back to said pre-amplifier to enable said pre-amplifier to keep said variable output source from becoming saturated,
 (e) an adjustable impedance in said feed-back loop,
 (f) said adjustable impedance being adjustable to adjust the output voltage of said variable output source prior to the initiation of an arc.

8. In a control system for an electric welder which has a variable output source responsive to a variable amplitude input signal and which saturates above a predetermined amplitude of said input signal, a pre-amplifier, and a connection from the output of said pre-amplifier to said variable output source, the improvement which comprises:
 (a) a feed-back loop around said pre-amplifier,
 (b) conduction-controlling means in said feed-back loop, and
 (c) a sensing circuit having means that causes said conduction-controlling means to conduct current or to become non-conductive, and thus keep said feed-back loop from feeding back around said amplifier, after an arc has been established.
 (d) said feed-back loop having means adapted, while said conduction-controlling means is conductive, to supply sufficient current feed-back to said pre-amplifier to enable said pre-amplifier to keep said variable output source from becoming saturated,
 (e) said means of said sensing circuit causing said conduction-controlling means to conduct current, and thus cause said feed-back loop to feed back around said pre-amplifier, prior to the initiation of an arc.

9. In a control system for an electric welder which has a variable output source responsive to a variable amplitude input signal and which saturates above a predetermined amplitude of said input signal, the improvement comprising:
 (a) a voltage-responsive element having an input in said control system that can affect the output voltage of said variable output source,
  a junction in said control system intermediate the output of said voltage responsive element and said variable output source,
  a feedback loop extending from said junction to said input of said voltage responsive element to provide negative voltage feedback to said voltage-responsive element,
 (b) relay contacts in said negative feed-back loop,
 (c) a voltage reference,
 (d) further relay contacts intermediate said voltage reference and the input of said variable output source,
 (e) a relay coil to close the first said and said further relay contacts, and
 (f) a sensing circuit having means that causes said relay coil to close the first said and said further relay contacts prior to the initiation of an arc and to open the first said and said further relay contacts after an arc has been initiated, and to keep said relay coil from closing the first said and said further relay contacts as long as said arc is established.
 (g) said negative feed-back loop, while the first said relay contacts are closed prior to the initiation of an arc, having means adapted to supply sufficient negative feed-back to keep the output voltage of said variable output source at a desired initial level, (h) said voltage reference being adjustable to selectively apply different values of positive or negative D.C. voltage to the input of said variable output source, while said further relay contacts are closed prior to the initiation of an arc, and thereby bias said variable output source to provide a desired output level as an arc is being initiated.

10. A control system for an electric welder which comprises:

(a) a variable output source responsive to a variable amplitude input signal and which saturates above a predetermined amplitude of said input signal, (b) a voltage-responsive element having an input in said control system that can affect the output voltage of said variable output source, a junction in said control system intermediate the output of said voltage responsive element and said variable output source, a feedback loop extending from said junction to said input of said voltage responsive element to provide negative voltage feedback to said voltage-responsive element, (c) relay contacts in said feed-back loop, (d) a voltage reference, (e) further relay contacts intermediate said voltage reference and the input of said variable output source that can be closed to enable said voltage reference to affect the output of said variable output source, (f) a relay coil to close the first said and said further relay contacts, and (g) a sensing circuit having means that causes said relay coil to close the first said and said further relay contacts prior to the initiation of an arc and to open the first said and said further relay contacts after an arc has been initiated, and to keep said relay coil from closing the first said and said further relay contacts as long as said arc is established, (h) said feed-back loop, while the first said relay contacts are closed prior to the initiation of an arc, having means adapted to supply sufficient feed-back to said variable output source to keep the output of said variable output source at a desired initial level.

11. A control system for an electric welder which comprises:

(a) a variable output source responsive to a variable amplitude input signal and which saturates above a predetermined amplitude of said input signal, (b) a voltage-responsive element having an input in said control system that can affect the output voltage of said variable output source, a junction in said control system intermediate the output of said voltage responsive element and said variable output source, a feedback loop extending from said junction to said input of said voltage-responsive element to provide negative voltage feedback to said voltage-responsive element, (c) conduction-controlling means in said feed-back loop, (d) a voltage reference, (e) further conduction-controlling means intermediate said voltage reference and the input of said variable output source that can be rendered conductive to enable said voltage reference to affect the output of said variable output source, (f) a sensing circuit having means that causes the first said and said further conduction-controlling means to conduct current prior to the initiation of an arc and that causes the first said and said further conduction-controlling means to become non-conductive after an arc has been initiated, and keeping the first said and said further conduction-controlling means non-conductive as long as said arc is established, (g) said feed-back loop, while the first said conduction-controlling means is conductive prior to the initiation of an arc, having means adapted to supply sufficient feed-back to said variable output source to set the output thereof at a desired initial level.

12. A control system for an electric welder which comprises:

(a) a variable output source responsive to a variable amplitude input signal and which saturates above a predetermined amplitude of said input signal, (b) a voltage-responsive element having an input in said control system that can affect the output voltage of said variable output source, a junction in said control system intermediate the output of said voltage responsive element and said variable output source, a feedback loop extending from said junction to said input of said voltage responsive element to provide negative voltage feedback to said voltage-responsive element, (c) conduction-controlling means in said feed-back loop, and (d) a sensing circuit having means that causes said conduction-controlling means to conduct current or to become non-conductive after an arc has been initiated and keeping said conduction-controlling means non-conductive as long as said arc is established, (e) said feed-back loop having means adapted, when said conduction controlling means conducts current, to supply sufficient feed-back to said variable output source to set the output thereof at a desirable level.

References Cited

UNITED STATES PATENTS 3,237,116    2/1966    Skinner et al. _____ 330—51

DAVID J. GALVIN, *Primary Examiner.*